United States Patent [19]

Nishikawa et al.

[11] Patent Number: 4,579,208
[45] Date of Patent: Apr. 1, 1986

[54] AUTOMATIC TRANSMISSION FOR AUTOMOTIVE VEHICLES

[75] Inventors: Masao Nishikawa, Tokyo; Shinzo Sakai, Miyoshi; Junichi Miyake, Hidaka, all of Japan

[73] Assignee: Honda Giken Kogyo Kabushiki Kaisha, Tokyo, Japan

[21] Appl. No.: 571,987

[22] Filed: Jan. 19, 1984

[30] Foreign Application Priority Data

Jan. 19, 1983 [JP] Japan .................................. 58-7607

[51] Int. Cl.⁴ ..................... B60K 41/02; B60K 41/28
[52] U.S. Cl. .............................. 192/0.076; 192/0.052; 192/3.3; 192/3.31
[58] Field of Search .............. 192/0.052, 0.076, 3.29, 192/3.3, 3.31, 103 R

[56] References Cited

U.S. PATENT DOCUMENTS

| | | | |
|---|---|---|---|
| 4,056,177 | 11/1977 | Ahlen et al. | 192/3.31 X |
| 4,086,992 | 5/1978 | Hamada et al. | 192/0.076 |
| 4,457,411 | 7/1984 | Hiramatsu | 192/3.31 X |
| 4,466,311 | 8/1984 | Hiramatsu | 192/103 R X |

FOREIGN PATENT DOCUMENTS 55-109854  8/1980  Japan .................................. 192/3.31

Primary Examiner—Allan D. Herrmann
Attorney, Agent, or Firm—Armstrong, Nikaido Marmelstein & Kubovcik

[57] ABSTRACT

Automatic transmission having a direct coupler in the torque convertor which is operated by at least two solenoid operated pilot valves which are energized by a controller sensing running conditions of the vehicle.

5 Claims, 6 Drawing Figures

AUTOMATIC TRANSMISSION FOR AUTOMOTIVE VEHICLES

BACKGROUND OF THE INVENTION

This invention relates to an automatic transmission for an automotive vehicle which is equipped with a hydraulic torque converter having direct-coupling means. Among automatic transmissions for automotive vehicles such as automobiles, those equipped with a hydraulic torque converter having a direct-coupling means have been developed. Such torque converter is adapted to directly couple or lock the input side of the torque converter to the output side of the same when hydraulic torque converting action is not required while the vehicle is running, so as to inhibit slippage in the torque converter for efficient driving of the vehicle.

Such direct-coupling of the torque converter is desired to take place from the time the vehicle is running at a low speed, to completely eliminate slippage of the torque converter. However, when the rotational speed of the engine is low, torque produced by the engine fluctuates widely. Therefore, vibrations of the engine are directly transmitted to the vehicle frame if the torque converter is directly coupled or completely locked in such a low vehicle speed region, causing discomfort to the driver. To avoid this, it is necessary to weaken the coupling force of the torque converter to allow small slippage of the torque converter thereby absorbing vibrations of the engine. On the other hand, in a high speed region of the engine, output torque of the engine is large to increase an amount of torque to be transmitted by the torque converter, requiring large direct-coupling force of the torque converter to inhibit slippage and transmission loss of torque through the torque converter.

SUMMARY OF THE INVENTION

This invention has been proposed in view of the above circumstances, and provides an automatic transmission for an automotive vehicle equipped with a hydraulic torque converter, which is adapted to control the coupling force of the hydraulic torque converter to values most appropriate to running conditions of the vehicle.

According to the invention, the automatic transmission for an automotive transmission for an automotive vehicle equipped with a hydraulic torque converter having a direct-coupling means, comprises a plurality of pilot valves formed of solenoid valves which are adapted to apply hydraulic pressure to a cylinder of the direct-coupling means of the torque converter. The solenoid valves are each electronically controlled in response to running conditions of the vehicle so as to control the coupling action of the torque converter in a stepwise manner varying the direct-coupling force. Particularly in a high speed region of the engine, the solenoid valves are operated in such a manner that the pilot pressure produced in the solenoid valves is prevented from escaping from the solenoid valves, to thereby obtain sufficient coupling force of the torque converter.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

An embodiment of the invention will now be described in detail with reference to the accompanying drawings.

Figures 1, 2:
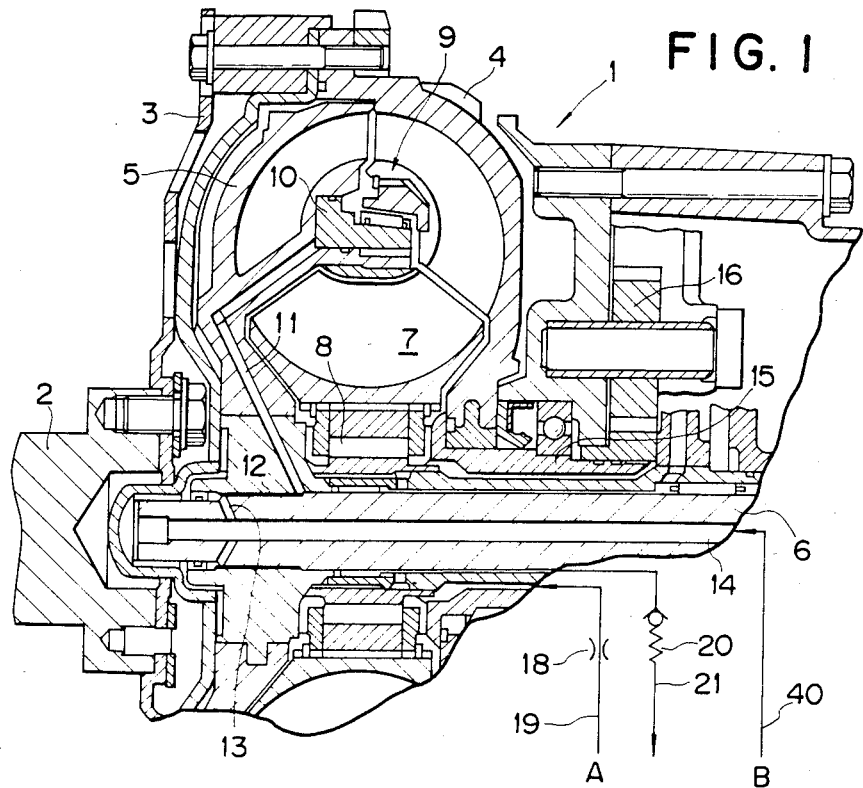
FIG. 1 is an elevational sectional view showing the arrangement of part of a torque converter having direct-coupling means, according to the invention.
FIG. 2 is a view showing the arrangement of a hydraulic pressure control system provided in the automatic transmission for automotive vehicles, according to a first embodiment of the invention.

FIG. 1 illustrates, by way of example, the arrangement of a hydraulic torque converter according to the invention. Power from the engine is transmitted to a pump 4 of the hydraulic torque converter 1 through a crankshaft 2 and a plate 3, and is thereafter transmitted to a turbine 5 in a hydrodynamic manner. The power transmitted to the turbine 5 is then transmitted to an output shaft 6 rigidly secured to the turbine 5. During this torque transmission through the torque converter 1, when torque is amplified in the torque converter 1, the resulting reaction force is borne by a stator 7 of the torque converter 1, whereas when no such amplification of torque occurs in the torque converter 1, the stator 7 runs idle through a free wheel 8 in the same direction as the pump 4 and the turbine 5. A right end of the output shaft 6, as viewed in FIG. 1, is connected to an input shaft of a secondary transmission, not shown, which selectively establishes a plurality of different speed reduction ratios.

Arranged between the pump 4 and the turbine 5 is a direct-coupling means 9. This direct-coupling means 9 has a piston 10 and is adapted to establish a direct-coupled state between the pump 4 and the turbine 5 when the piston 10 is urgedly moved by hydraulic pressure in the rightward direction in FIG. 1, to thereby mechanically transmit only the torque from the engine to the output shaft 6. Direct-coupling means of this type is described in detailed in Japanese Patent Application No. 55-15763, filed in the United States as application Ser. No. 318,985, now U.S. Pat. No. 4,457,413, dated July 3, 1984, and filed by the applicant of the present application, explanation of which is therefore omitted here. Operating fluid for actuating the direct-coupling means 9 with its pressure is supplied thereto through a passageway formed by a hole 11 formed through the turbine 5, a clearance 12 defined between splined portions of the turbine 5 and the output shaft 6, oblique hole 13 formed in the output shaft 6, and passage 14 formed in the output shaft 6 along its axis.

A hollow shaft 15 is arranged adjacent the pump 4 and coupled to same to drive a hydraulic pump 16. The hydraulic pump 16, which also appears in the hydraulic system shown in FIG. 2, designated by the same reference numeral, operates to draw operating fluid from a tank 17 and feed it through a passage 19 formed with an orifice 18 to the torque converter 1. The operating fluid is circulated in the torque converter 1 and then returned through a passage 21 provided with a check valve 20, to the tank 17 after being cooled by a cooler (not shown).

FIG. 2 shows an example of the arrangement of a hydraulic pressure control system which is provided in the automatic transmission of the invention. The system comprises a hydraulic pressure control circuit 22 for effective selective establishment of speed reduction ratios through the secondary transmission, and a control section 23 for controlling the direct-coupling means 9 of the torque converter 1.

The hydraulic pressure control circuit 22 operates on input signals such as a signal S1 indicative of the vehicle speed, a signal S2 indicative of the valve opening of a throttle valve of the engine and a signal S3 indicative of the position of a shift lever of the transmission, to control the secondary transmission for selectively establishing reduction ratios of 1st, 2nd and 3rd speeds in dependence on transmission characteristics which have been set previously by computer or by hydraulic control means. More specifically, the control circuit 22 is supplied with part of the operating fluid discharged from the aforementioned pump 16 to selectively operate either one of frictionally engaging elements (e.g. clutches) C1, C2 and C3 for transmission gears of the secondary transmission. The hydraulic control circuit 22 in FIG. 2 is substantially identical with one generally adopted in automatic transmissions for vehicles, detailed explanation of which is therefore omitted.

The direct-coupling means controlling section 23 comprises two pilot valves 24 and 25 formed of solenoid valves which are connected in series with each other, and a control circuit 29 for controlling the on and off operations of the solenoid valves 24, 25. The control circuit 29 operates on the vehicle speed signal S1 supplied from a vehicle speed sensor 26 and the throttle valve opening signal S2 supplied from a throttle valve opening sensor 27, to perform on- and off-control of the solenoid valves 24, 25 by the use of a control map which has been set previously. The solenoid valve 24 is arranged to be supplied with part of the pressurized operating fluid discharged from the pump 16, while the solenoid valve 25 is connected to the passage 14 in FIG. 1 to supply the same passage 14 with operating fluid having a controlled pressure. The control circuit 29 may further be supplied with the shift lever position signal S3 outputted from a shift lever position sensor 28, if required, so as to control the direct-coupling of the torque converter 1 only when it is determined by the controller through the signal S3 that the shift lever is in a D-range position.

The above two solenoid valves 24, 25 are constructed as follows: The solenoid valve 24 is arranged between two passages 30 and 31, and includes a valve body, a valve spool 33 in the valve body disposed to be biased toward its opened position by the force of a spring 32, and to be biased toward its closed position by the pressure of operating fluid supplied thereto through the passage 30. More specifically, a chamber 34 accomodating the spring 32 is supplied with operating fluid from the passage 30 by way of a restriction 35, and piston chamber 34' is supplied with operating fluid from the passage 30 by way of a restriction 35'. When the solenoid valve 24 has its solenoid 36 deenergized to close a restriction 38 with its armature 37, the pressures of operating fluid acting upon both sides of the valve spool 33 are equilibrated to allow the urging force of the spring 32 alone to be applied to the valve spool 33, thereby holding the valve spool 33 in its opened position, as shown in FIG. 2. When the valve spool 33 of the solenoid valve 24 is thus held in the opened position, the pressure of operating fluid from the passage 30 is maintained at the same level as pressurized by the pump 16 while passing through the solenoid valve 24, and then applied to the solenoid valve 25 through the passage 31. On the other hand, when the solenoid 36 is energized so that the armature 37 is in a position opening the restriction 38, the chamber 34 is communicated with the tank 17 through a port 39 to allow operating fluid supplied there to return to the tank 17. As a consequence, the pressure in the chamber 34 drops to almost the same level as that of the atmospheric pressure to cause the valve body 33 to move leftward to the closed position, as the operating fluid pressure acting upon the right-hand end of the valve spool 33 then surpasses the force of the spring 32. When the valve spool 33 is in its closed position, operating fluid from the passage 30, which has been pressurized by the pump 16, is reduced in pressure while passing through the solenoid valve 24 by returning part of the operating fluid to the tank 17, and then the operating fluid thus reduced in pressure is supplied to the solenoid valve 25 through the passage 31. On this occasion, the pressure of operating fluid in the passage 31 supplied from the solenoid valve 24 has a constant value which is determined by the force of the spring 32.

The solenoid valve 25 is arranged between the passage 31 and a passage 40, and has a valve body, a valve spool 42 in the valve body disposed to be biased toward its drain position by the force of a spring 41, and toward its opened position by the pressure of operating fluid supplied thereto through the passage 31. That is, the operating fluid is supplied to a chamber 44 from the passage 31 through a restriction 43. When the solenoid valve 25 has its solenoid 45 energized to cause its armature 46 to open a restriction 47, the operating fluid is allowed to escape from the chamber 44 to the tank 17 by way of a port 48. Consequently, the pressure in the chamber 44 is reduced almost to the atmospheric pressure level to thereby hold the valve spool 42 in its drain position, as shown in FIG. 2, by the force of the spring 41. When the valve spool 42 is thus in the drain position, the passage 40 is communicated with a port 49 which is connected to the tank 17, and accordingly no operating fluid pressure is applied to the direct-coupling means 9 of the torque converter 1. On the other hand, when the solenoid 45 is deenergized to cause the armature 46 to close the restriction 47, the operating fluid pressure in the chamber 44 now surpasses the force of the spring 41 to cause the valve spool 42 to move rightward or toward the opened position. When the valve spool 42 is thus in the opened position, the passages 31 and 40 are communicated with each other to apply controlled pressure of operating fluid to the direct-coupling means 9 of the torque converter 1 through the passage 40. Incidentally, the solenoids 36 and 45 have the same structure, of which the interior construction of the solenoid 45 is shown in FIG. 2. The solenoid valve 25 also has a port 50 connected to the tank 17.

Figure 3:
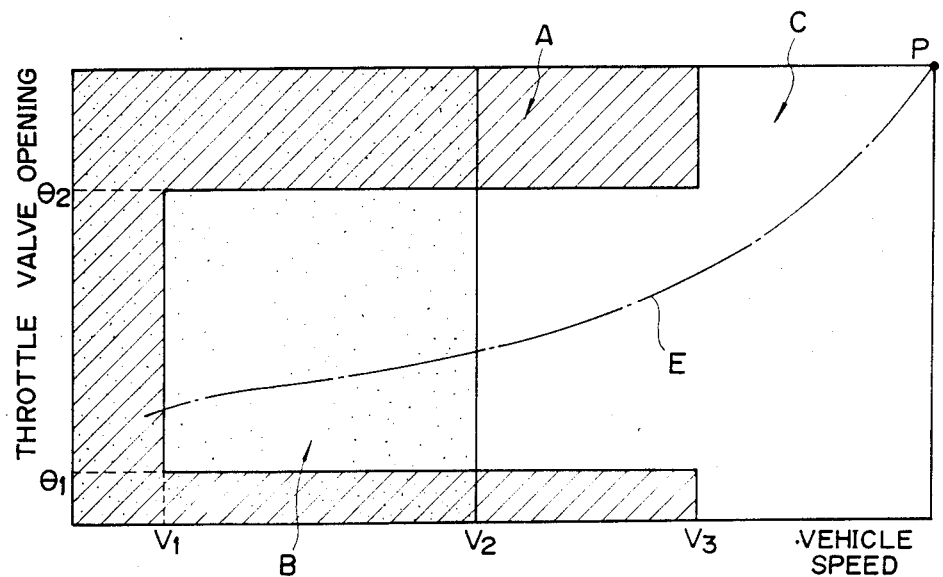
FIG. 3 is a view showing a control map, by way of example, for controlling the coupling force of the torque converter in dependence on running conditions of the vehicle.

With the arrangement described above, the present invention is characterized primarily by the solenoid valves 24, 25 being controlled by the direct-coupling control circuit 29 by the use of a control map shown in FIG. 3.

The direct-coupling control circuit 29 determines running conditions of the vehicle on the basis of the vehicle speed signal S1 and the throttle valve opening signal S2. When it is determined by the control circuit 29 that the vehicle is running in a region A which is hatched in FIG. 3, the solenoid 45 of the solenoid valve 25 is energized to drive the valve spool 42 to move toward the drain position, thereby holding the direct-coupling means 9 of the torque converter 1 in a non-coupled state. Accordingly, in this region A, normal automatic transmission control is performed by the torque converter 1 under the control of the hydraulic pressure control circuit 22. When the direct-coupling control circuit 29 determines that the vehicle is running in a region B which is dotted in FIG. 3, on the basis of the vehicle speed signal S1 and the throttle valve opening signal S2, the solenoid 36 of the solenoid valve 25 is energized to move the valve spool 33 to the closed position, whereby operating fluid is supplied to the solenoid valve 25 after having its pressure reduced by the solenoid valve 24. When the vehicle is determined to be running in a region C which is blank in FIG. 3, the solenoid 36 of the solenoid valve 24 is deenergized to cause the valve spool 33 to move to the opened position, thereby supplying the solenoid valve 25 with operating fluid at high pressure, i.e. operating fluid not reduced in pressure at all.

Figure 4:
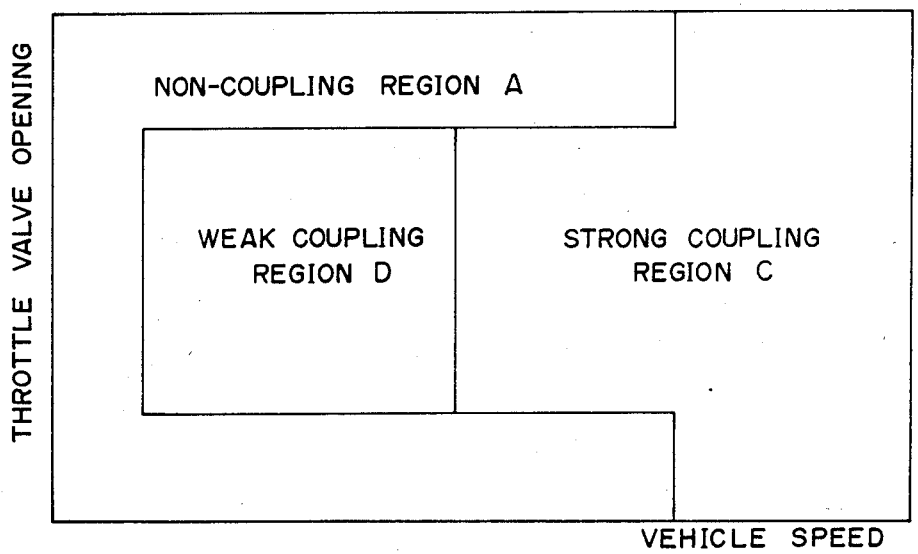
FIG. 4 is a view showing degrees of coupling force achieved by the torque converter in various vehicle running regions, by the use of the control map of FIG. 3.

In this manner, the direct-coupling means 9 of the torque converter 1 is responsive to running conditions of the vehicle determined on the basis of the vehicle speed and the throttle valve opening, to selectively assume a non-coupled state, a weakly coupled state or a strongly coupled state, respectively, when the vehicle is running in the regions A, D and C shown in FIG. 4.

In FIG. 3, the chain curve E shows a desired degree of valve opening of the throttle valve with respect to the vehicle speed while the vehicle is running in a cruising condition. The point P shows a condition of the vehicle in which the vehicle speed and the throttle valve opening both assume their maximum values. As is clear from the characteristic shown by the curve E, the higher the vehicle speed, the larger the degree of the throttle valve opening, and the larger the output torque of the engine become. When the vehicle is in a high speed region, the direct-coupling means 9 of the torque converter 1 should therefore have a large enough coupling force to prevent the situation wherein the output torque of the engine is larger than the coupling force of the direct-coupling means 9 causing slippage in the torque converter 1 even when the vehicle is in a cruising condition. As a consequence, even if a small amount of operating fluid escapes from the solenoid valves 24, 25 while the solenoid valves 24, 25 are in a position to supply operating fluid to the direct-coupling means 9 of the torque converter 1 in the high vehicle speed region, a considerable pressure drop occurs in the operating fluid due to such escape of operating fluid as well as due to the flow resistance of operating fluid through the passages, resulting in insufficient coupling force of the direct-coupling means 9. Although this pressure drop in the operating fluid can be reduced by setting the openings of the restrictions 38, 47 of the respective solenoid valves 24, 25 to be small by enlarging the effective cross-sectional areas of the fluid passages, there will actually be some difficulties to realize these measures in manufacturing the control system. One could provide an alternative measure that the piston 10 of the direct-coupling means 9 has enough of an increased pressure-applying area to obtain sufficient coupling force irrespective of a pressure drop in the operating fluid. However, to realize this measure there is only left a very limited space for the piston 10. Therefore, according to the invention, the solenoid valves 24, 25 are constructed and controlled in a manner such that the operating fluid is completely inhibited from escaping through the solenoid valves 24, 25 when operating fluid pressure controlled by the solenoid valves 24, 25 is applied to the direct-coupling means 9 of the torque converter 1 in the high vehicle speed region in particular, to thereby obtain a sufficient coupling force of the direct-coupling means 9 which can fully cope with the output torque of the engine.

Figure 5:
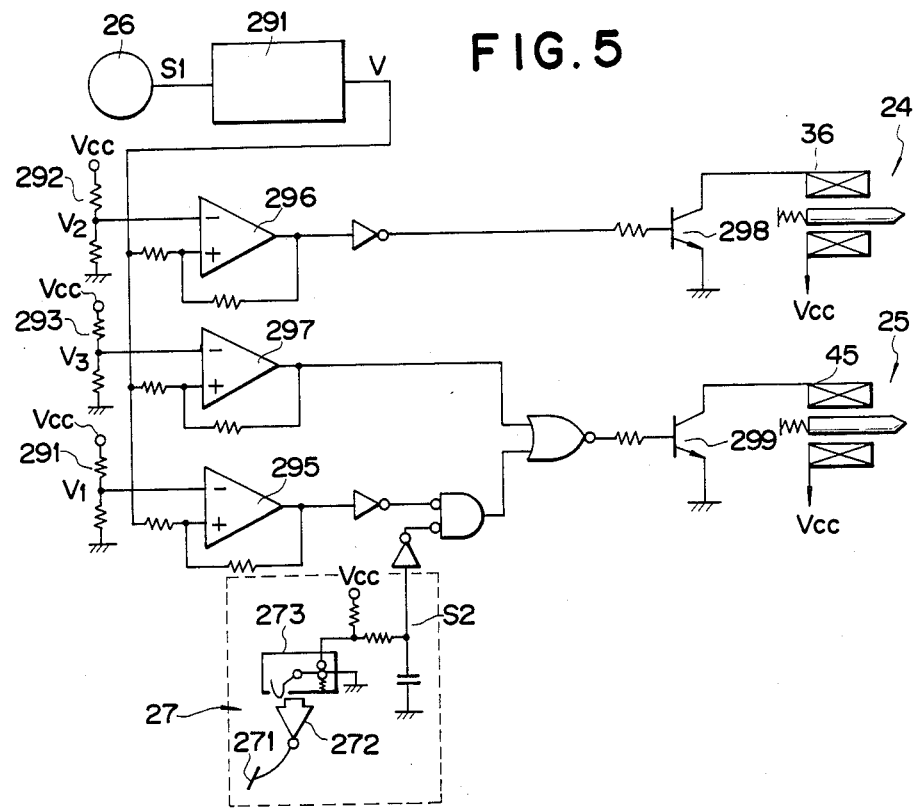
FIG. 5 is a wiring diagram of an example of a direct-coupling control circuit provided in the automatic transmission according to the first embodiment of the invention.

FIG. 5 shows an example of the arrangement of the direct-coupling control circuit 29. The control circuit 29 according to this example is constructed as follows: a vehicle speed-to-voltage converter circuit 290 is arranged to be supplied with the vehicle speed signal S1 from the vehicle speed sensor 26, which may be in the form of pulses generated in response to rotation of the wheels of the vehicle for instance, and perform frequency-to-voltage conversion of the signal S1 into a voltage signal v having a value corresponding to the vehicle speed. Comparators 295, 296 and 297 are each arranged to be supplied with the vehicle speed voltage signal v, and compare the same signal v with respective reference vehicle speed valves v1, v2 and v3 which are set, respectively, by speed-setting devices 291, 292 and 293. A driver 298 is adapted to cause energization and deenergization of the solenoid 36 of the solenoid valve 24 referred to above, in response to a level-inverted signal supplied from the comparator 296 through an inverter. A driver 299 is adapted to cause energization and deenergization of the solenoid 45 of the solenoid valve 25 in response to a signal from a NOR circuit, which is supplied with an output from the comparator 297 and an output from a NAND circuit connected at its input to the output of the comparataor 295 and the throttle valve opening sensor 27 through respective inverters. The reference speed or voltage values v1, v2, v3 of the speed-setting devices 291, 292, 293 are set at values corresponding to the vehicles speed V1, V2, V3 in FIG. 3, respectively (that is, v1 < V2 < v3). The throttle valve opening sensor 27 comprises, for instance, a cam 272 provided on an accelerator pedal 271 of the engine, and a microswitch 273 operable in response to displacement of the cam 272. The microswitch 272 is disposed to be turned off by the cam 272 when a detected valve opening value of the throttle valve falls between 01 and 02 in FIG. 3, to generate a throttle valve opening signal S2 having a high level H. The same switch 273 is disposed to be turned on when the detected throttle valve opening value is outside the range defined by the values 01, 02, to generate a throttle valve opening signal S2 having a low level L.

The direct-coupling control circuit 29 constructed as above operates as follows: Before the value of the vehicle speed signal v reaches the first reference value v1, the comparator 295 continuously generates an output signal having a low level L (at this time, an output signal from the comparator 297 also has a low level), thereby holding the driver 299 in a state wherein the solenoid 45 of the solenoid valve 25 is in an energized state. On this occasion, the drive 298 is also kept in an ON state since an output signal from the comparator 296 has a low level L, to keep the solenoid 36 of the solenoid valve 24 energized. As the value of the vehicle speed signal v increases above the first reference value v1, an output signal from the comparator 295 has its level inverted into a high level H. On this occasion, the solenoid 45 of the solenoid valve 25 is maintained in an energized state so long as the throttle valve opening value is outside the range defined by the previously set values 01, 02 so that the value of the throttle valve opening signal S2 has a low level L, and at the same time the value of the vehicle speed signal v is below the third reference value v3 so that an output signal from the comparator 297 has a low level L. On the other hand, when the throttle valve opening value falls within the range defined by the values 01, 02 so that the value of the throttle valve opening signal S2 has a high level H, the drive 299 is turned off to deenergize the solenoid 45 of the solenoid valve 25. When the value of the vehicle speed signal v reaches the third reference value v3 to cause an inversion in the level of an output signal from the comparator 297 into a high level H, the drive 299 is turned off irrespective of the throttle valve opening, and the solenoid 45 of the solenoid valve 25 is maintained in a deenergized state so long as the vehicle speed signal v is above the third reference value v3. On the other hand, when the vehicle speed signal v rises above the second reference value v2, the output from the comparator 296 then is inverted into a high level H, thereby deenergizing the solenoid 36 of the solenoid valve 24.

The direct-coupling control circuit 29, described above, may of course alternatively be relaced by a computer.

In the above described example in which part of the operating fluid is permitted to escape through the solenoid valves 24, 25 when then the vehicle is started or runs at low speeds, there can be a shortage in the hydraulic pressure within the whole system, if the capacity of the pump 16 is small.

Figure 6:
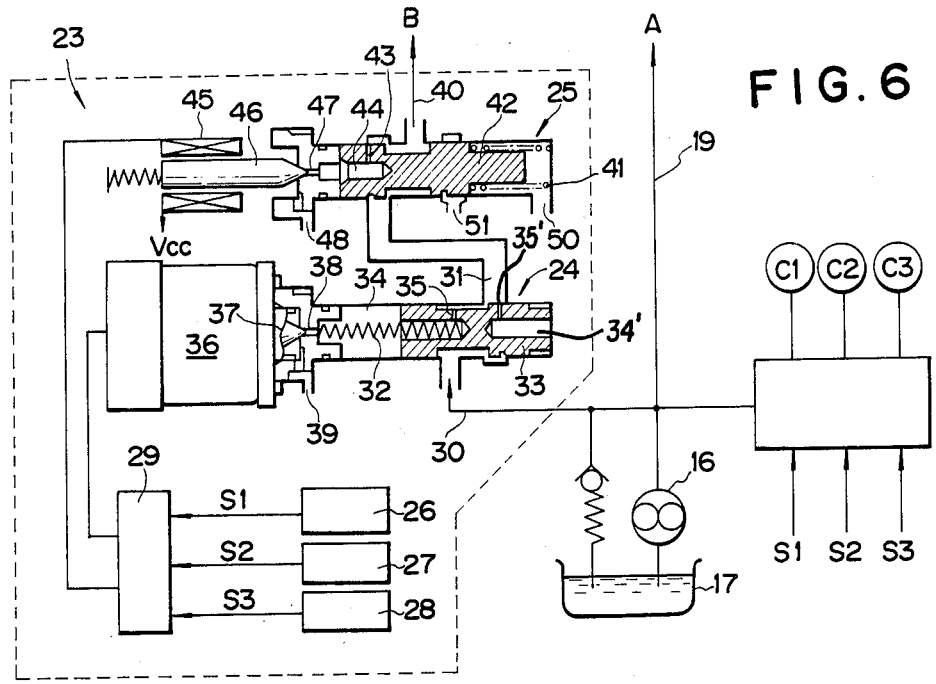
FIG. 6 is a view showing another example of the arrangement of the hydraulic pressure control system.

FIG. 6 shows an alternative manner of controlling the solenoid valves 24, 25, which has overcome such a shortage of the hydraulic pressure. In FIG. 6, the solenoid valve 25' is disposed to operate in a manner reverse to that of the solenoid valve 25 shown in FIG. 2, so that operating fluid is prevented from escaping through the solenoid valve 24 when the vehicle is started or runs at low speeds, while in the high speed cruising condition of the vehicle operating fluid is prevented from escaping through the solenoid valve 25', thereby reducing the pressure drop caused by the solenoid valves 24, 25' to half as much as that with the arrangement shown in FIG. 2. That is, when the valve spool 42' of the solenoid valve 25' is in the opened position by energization of the solenoid 45', the passage 31 on the input side is communicated with the passage 40 on the output side, while when the valve spool 42' is in the closed position, that is, when the solenoid 45' is in a deenergized state, the passage 40 is communicated with the port 51 connected to the tank 17. The arrangement of the component elements other than the solenoid valve 25 is identical with that shown in FIG. 2. With the arrangement of FIG. 6, escape of operating fluid through each of the solenoid valves 24, 25' is permitted in the weak coupling region D in FIG. 4. However, when the vehicle reaches this region D the vehicle has already reached a medium speed running condition, wherein the rotational speed of the engine, i.e. that of the pump 16 is already large enough so that no substantial pressure drop takes place in the operating fluid in the whole system. Further, since the present control is intended to weaken the coupling force of the torque converter 1 when the vehicle is in the region D any pressure drop in the operating fluid will not affect the coupling of the torque converter 1.

As stated above, according to the invention, the automatic transmission for an automotive vehicle, equipped with a hydraulic torque converter having a direct-coupling means, comprises at least two solenoid valves serving as pilot valves and arranged in series with each other, the solenoid valves being adapted to stepwise regulate the pressure of operating fluid to be applied to the direct-coupling means, and means adapted to detect running conditions of the vehicle and control the opening and closing actions of each of the solenoid valves on the detected running conditions and in accordance with a control map which has been set previously, wherein the operating fluid is inhibited from escaping through at least one of the solenoid valves when the solenoid valves are in a position to regulate the operating fluid pressure to a high level and apply same to the direct-coupling means of the torque converter. Therefore, the present invention has advantages that the coupling force of the torque converter can be controlled to values best suited to running conditions of the vehicle, and that a sufficient coupling force of the torque converter can be obtained particularly in a high vehicle speed region, by restraining escape of operating fluid through the solenoid valves.

It is readily apparent that the above-described direct coupling controller for a torque convertor of an automatic transmission meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An automatic transmission for an automotive vehicle, equipped with a hydraulic torque converter having direct-coupling means, the automatic transmission being characterized by comprising at least two pilot valves formed of solenoid valves and arranged in series with each other, said solenoid valves being adapted to regulate in a stepwise manner the pressure of operating fluid and apply the thus controlled pressure to said direct-coupling means of said hydraulic torque converter, and means adapted to detect running conditions of the automotive vehicle and control the opening and closing action of each of said solenoid valves in accordance with a control map which has been set previously, wherein the operating fluid is inhibited from escaping through at least one of said solenoid valves when said solenoid valves are in a position to regulate the pressure of operating fluid to a high level and apply the high level pressure to said direct-coupling means of said hydraulic torque converter; and one of said at least two pilot valves comprises a valve body having a bore, a valve spool in said bore movable between an opened position and a closed position, a first chamber in said bore at one end of said spool, a second chamber in said bore at the other end of said spool, a spring in said first chamber biasing said spool towards said opened position, an inlet port, an outlet port, means permitting pressure to enter said first an second chambers, a restriction opening into said first chamber, a solenoid having an armature which when energized opens said restriction and when de-energized blocks said restriction, and an opening to drain downstream of said restriction, said inlet port being fully connected to said outlet port to produce high pressure thereat when said spool is in said opened position when said solenoid is de-energized, and said inlet port being only partially opened to said outlet port to produce lowered pressure thereat when said spool is in said closed position when said solenoid is energized, said outlet port being connected to the other of said at least two pilot valves.

2. An automatic transmission according to claim 1, wherein said means adapted to detect running conditions and control the opening and closing action of each of said solenoids includes vehicle speed sensing means producing a speed signal proportional to vehicle speed, throttle opening sensing means producing a throttle signal when a throttle is between a first position and a second position, means producing several speed reference signals, comparator means receiving said speed signal and said several speed reference signals and producing outputs depending on a comparison of the value of said speed signal relative to said reference signals, first driver means for energizing one of said solenoid valves, second driver means for energizing another of said solenoid valves, and logic means interconnecting said comparator means to said first and second driver means for de-energizing said first driver means if said speed signal is above a middle speed reference signal to apply pressure to said direct-coupling means, for de-energizing said second driver means if said speed reference signal, and for de-energizing said second driver means if said speed signal and said throttle opening sensing means produces a signal.

3. An automatic transmission according to claim 1, wherein the other of said at least two pilot valves comprises another valve body having a bore, a valve spool in said bore in said bore in said another body moveable between a drain position and an opened position, a chamber in said bore at one end of said spool, a spring at the other end of said spool biasing said spool towards said chamber, an inlet port connected to said outlet port of said one pilot valve, an outlet port connected to said direct-coupling means, means permitting fluid pressure to enter said chamber, a drain port, a restriction opening into said chamber, another solenoid having an armature which when energized opens said restriction and when de-energized blocks said restriction, said inlet port being connected to said outlet port connected to said direct coupling means when said spool is in said opened position, and said inlet port being connected to said drain port when said spool is in said drain position.

4. An automatic transmission according to claim 3, wherein when said another solenoid is energized and said restriction is thereby opened, said spool moves to said drain position under the biasing force of said spring.

5. An automatic transmission according to claim 3 wherein when said another solenoid is energized and said restriction is thereby opened, said spool moves to said opened position under the force of said spring.

* * * * *